United States Patent [19]
Baskent et al.

[11] 4,367,291
[45] Jan. 4, 1983

[54] REDUCING THE FLAMMABILITY OF FLEXIBLE POLYURETHANE FOAMS

[75] Inventors: Feyyaz O. Baskent, Mahopac; Mark L. Bye, South Nyack, both of N.Y.

[73] Assignee: Union Carbide Corporation, Danbury, Conn.

[21] Appl. No.: 279,449

[22] Filed: Jul. 1, 1981

[51] Int. Cl.³ .................. C08G 18/14; C08G 18/32
[52] U.S. Cl. .................................. 521/112; 252/182
[58] Field of Search .............. 521/112; 252/182, 8.1

[56] References Cited
U.S. PATENT DOCUMENTS

| | | | |
|---|---|---|---|
| 3,205,120 | 9/1965 | Flanders | 156/309.9 |
| 3,497,416 | 2/1970 | Critchfield et al. | 428/245 |
| 3,966,650 | 6/1976 | Prokai | 521/112 |
| 3,979,420 | 9/1976 | Prokai et al. | 521/112 |
| 3,980,688 | 9/1976 | Litteral et al. | 556/445 |

Primary Examiner—H. S. Cockeram
Attorney, Agent, or Firm—Paul W. Leuzzi, II

[57] ABSTRACT

Combustibility properties of flexible polyurethane foams made with flame retardant additives are increased by incorporating into the foam-forming reaction mixture a combination of certain flame retardant surfactants and certain low molecular weight polyols.

5 Claims, No Drawings

REDUCING THE FLAMMABILITY OF FLEXIBLE POLYURETHANE FOAMS

BACKGROUND OF THE INVENTION

1. Field of the Invention

This invention relates to flame retardant flexible polyurethane foams.

2. Description of the Prior Art

Flame retardant flexible polyurethane foams have been made with flame retardant siloxane-polyoxyalkylene block copolymers. Non-flame retardant foams have been made utilizing low molecular weight polyols to improve physical properties such as tear and elongation or load-bearing characteristics.

SUMMARY OF THE INVENTION

It has now been found that low molecular weight polyols can be utilized along with flame retardant siloxane-polyoxyalkylene block copolymers to produce flame retardant flexible polyurethane foams having combustibility properties unexpectedly superior to those of similar foams made without said low molecular weight polyols.

DESCRIPTION OF THE PREFERRED EMBODIMENTS

Processes for the production of flexible polyurethane foams are well known in industry. The most important components of the foam-forming reaction mixtures, in terms of weight, are aromatic polyisocyanates, such as tolylene diisocyanates, and polyether polyols, particularly those having hydroxyl numbers ranging from about 45 to about 60 and molecular weights ranging from about 2500 to about 4000.

However, the foam-forming reaction mixtures invariably contain other ingredients which, although they are present in relatively small proportions by weight, have controlling influence over the properties of the foam produced by the reaction between the aromatic diisocyanate and the polyether polyol. Among them are conventional compounds such as amine and tin catalysts, blowing agents such as water and trichlorofluoromethane, and surfactants. Less usually, perhaps, other conventional additives such as flame retardant agents (e.g., Thermolin-101) may be present.

The present invention is based upon the unexpected discovery that the use together, in the preparation of flame retardant flexible polyurethane foams, of two classes of compounds, each in itself known for use in other contexts as a suitable ingredient for some types of polyurethane foam-forming reaction mixtures, can significantly increase combustibility properties of flame retardant polyurethane foams.

The first of said class of compounds comprises flame retardant polysiloxane-polyoxyalkylene block copolymer surfactants, e.g. of the type disclosed in U.S. Pat. No. 3,980,688 (the disclosure of which is incorporated herein by reference). A preferred class of flame retardant surfactants are those of the formula

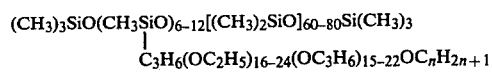

wherein n is an integer of from 1 to 8. In the most preferred embodiment, the flame retardant surfactant has the formula

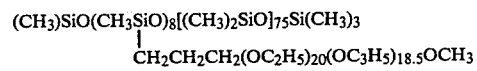

Such surfactants are generally used at a rate of from about 1 to about 2 weight percent, based on the polyether polyol.

The second of said class of compounds comprises one or more low molecular weight polyols of one or more of the formulae:

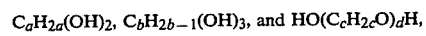

wherein a is an integer of from 2 to 12, b is an integer of from 3 to 11, c is an integer of from 2 to 4, and d is an integer of from 2 to 4. Exemplary of such compounds are ethylene glycol, propylene glycol, diethylene glycol, and, most preferred, dipropylene glycol. Such component is generally used at a rate of from as low as 0.4 to 2.0 weight percent, based on the weight of the polyether polyol. The most effective level of use for a particular foam-forming reaction mixture depends upon the nature and amount of the other components thereof. The most effective level can be determined by routine experimentation as in the Examples hereinbelow.

Combinations of the low molecular weight polyol with the flame retardant surfactant are indefinitely stable and, as such, produce a homogeneous product which may be shipped and stored until needed.

The foams produced in accordance with this invention can be used in the same areas and for the same purposes as conventional flexible foams designed for use in applications when their response to flaming situations is of importance (e.g., in cushioning materials, mattresses, automotive interior parts, etc.).

EXPERIMENTAL

The foams used in evaluating this invention involve the following components and formulating technique:

| | Weight in grams |
|---|---|
| NIAX Polyol 16–46 (A secondary hydroxyl polyol having a hydroxy number of 46 produced by reacting glycerol with ethylene oxide and propylene oxide) | 325 |
| Thermolin-101 (A flame retardant additive of the nominal formula $(ClCH_2CH_2O)_2P(=O) [(OCH_2CH_2OP(=O)OCH_2CH_2Cl)]_n$ wherein n = 0–2). | Varied |
| Water | 9.33 |

| -continued | Weight in grams |
|---|---|
| NIAX Amine Catalyst A-10 (A blend of bis[2-(N,N—dimethylamino)ethyl] ether, 2-[2-(N,N—dimethylamino) ethoxy]ethanol, and dipropylene glycol) | 0.70 |
| Stannous Octoate | 0.788 |
| Fluorotrichloromethane | 56.0 |
| Flame Retardant Surfactant L A compound of the formula | Varied |

$$(CH_3)_3SiO(CH_3SiO)_8[(CH_3)_2SiO]_{75}Si(CH_3)_3$$
$$\underset{CH_2CH_2CH_2(OC_2H_5)_{20}(OC_3H_5)_{18.5}OCH_3}{|}$$

| | |
|---|---|
| Dipropylene Glycol | Varied |
| TDI (A mixture of 80 wt % 2,4-tolylene diisocyanate and 20 wt % 2,6-tolylene diisocyanate | Formulated to an Index of 110 |

Foams were prepared by the following procedure:

(a) A cardboard container was charged with 350 grams of the polyol.

(b) Varied amounts of the flame retardant additive were added to the polyol and dispersed therein with a spatula.

(c) A combination of a varied amount of the flame retardant surfactant and a varied amount of the dipropylene glycol was added, via a 10 cc syringe, to a mixture as produced in (b) and was dispersed therein with a spatula.

(d) A baffle was set into the cardboard box containing the mixture produced in (c).

(e) 9.33 grams of water and 0.70 grams of the amine catalyst were added to the mixture obtained in (d), without express dispersion.

(f) 56.0 grams of fluorotrichloromethane were added to the mixture produced in (f), without dispersion.

(g) The cardboard box containing the mixture obtained in (f) was placed under a drill press. The mixture was agitated for 15 seconds at 2700 revolutions per minute.

(h) 0.788 grams of stannous octoate was added to the mixture obtained in (g), utilizing a 2 cc syringe.

(i) The mixture produced in (h) was agitated for 8 seconds at 2700 revolutions per minute, at which point the entire amount of TDI was rapidly added; the agitation was continued for an additional 7 seconds.

(j) Immediately, thereafter, the mixture was poured into a 14"×14"×12" parchment-lined cake box supported by a metal frame.

(k) The foam was allowed to remain in the box for at least 3 minutes. (This is to avoid the dense ridge that will appear if the cake box is removed from the metal frame when the foam is green.)

(l) The foam was then cured for 15 minutes at 125° C.

(m) The foam was then cut.

Rise, breathability, and burning extent were measured. The terms "rise," "burning extent", and "breathability" used in the Examples below have the following meanings:

Rise—denotes the foam height. Rise is directly proportional to surfactant potency.

Burning extent—denotes the burned length of a test specimen of foam measured in accordance with ASTM D-1692-68 and California Bulletin 117. The flammability of an MVSS 302 foam is proportional to its burning extent as measured by this test.

Breathability—denotes the porosity of a foam and is roughly proportional to the number of open cells in a foam. Breathability is measured as follows: A 2"×2"×1" piece of foam is cut from near the center of a bun. Using a Nopco Foam Breathability Tester, GP-2 Model 40GD10, air is drawn through the 1" portion at a pressure differential of 0.5 inches of water less than atmospheric pressure. The air flow is parallel to direction of original foam rise. The degree of openness of the foam (or foam breathability) is measured by air flow and is designated as standard cubic feet per minute.

The following Examples illustrate the present invention. Unless otherwise specified, parts and percentages are on a relative weight basis and temperatures are on the Centigrade scale.

EXAMPLES 1 AND 2

In both of these Examples, the foam-forming reaction mixture contained 100 parts NIAX Polyol 16-46, 2.0 parts Thermolin-101, 16 parts fluorotrichloromethane, 2.95 parts water, 0.2 parts NIAX Amine Catalyst A-10, 0.225 parts stannous octoate, and 39.5 parts TDI. In Example 1, Flame Retardant Surfactant L was present in 1.3 parts. In Example 2, Flame Retardant Surfactant L was present in 1.8 parts. In both Examples, the dipropylene glycol content was graduated as indicated in the Tables. The ambient temperature in all cases was 79° F.

TABLE 1

| Dipropylene Glycol | 0.2 | 0.4 | 0.6 | 0.8 | 1.0 | 1.5 | 2.0 |
|---|---|---|---|---|---|---|---|
| Cream Time (Sec.) | 11–12 | 11–12 | 11–12 | 12 | 12–13 | 12–13 | 13–14 |
| Rise Time (Sec.) | 138 | 187 | 187 | 138 | 140 | 141 | 142 |
| Top Collapse (Inches) | 0.4 | 0.5 | 0.45 | 0.4 | 0.4 | 0.3 | 0.4 |
| Height of Rise (Inches) | 10.6 | 10.5 | 10.8 | 10.8 | 10.8 | 10.5 | 10.5 |
| Breathability (SCFM) | 4.75 | 4.24 | 4.50 | 4.25 | 4.5 | 3.0 | 4.0 |
| Density (PCF) | 1.22 | 1.22 | 1.22 | 1.22 | 1.23 | 1.23 | 1.24 |

TABLE 1-continued

| Dipropylene Glycol | 0.2 | 0.4 | 0.6 | 0.8 | 1.0 | 1.5 | 2.0 |
|---|---|---|---|---|---|---|---|
| Flammability Test MVSS 302 (avg. 3 Samples) | | | | | | | |
| Burning Extent (Inches) | 13 | 13 | 13 | 11.1 | 11.5 | 7.0 | 4.9 |
| Extinguishing Time (Sec.) | 127 | 129 | 123 | 113 | 111 | 67 | 40 |

The data indicate that, at a flame retardant surfactant level of 1.3, dipropylene glycol concentrations of 0.8 parts to 2.0 parts significantly improved combustibility properties of the foams embodying them.

TABLE 2

| Dipropylene Glycol | 0.2 | 0.4 | 0.6 | 0.8 | 1.0 | 1.5 | 2.0 |
|---|---|---|---|---|---|---|---|
| Cream Time (Sec.) | 12 | 12 | 12 | 12 | 12 | 12 | 12 |
| Rise Time (Sec.) | 133 | 134 | 132 | 133 | 134 | 131 | 133 |
| Top Collapse (Inches) | −.14 | −.20 | −.20 | −.20 | −.20 | −.2 | −.2 |
| Height of Rise (Inches) | 10.5 | 10.6 | 10.7 | 10.5 | 10.5 | 10.4 | 10.6 |
| Breathability (SCFM) | 4.25 | 4.25 | 3.74 | 3.50 | 4.0 | 3.50 | 3.75 |
| Density (PCF) | 1.21 | 1.22 | 1.23 | 1.23 | 1.23 | 1.24 | 1.24 |
| Flammability Test MVSS 302 (avg. 3 Samples) | | | | | | | |
| Burning Extent (Inches) | 13 | 13 | 13 | 13 | 13 | 8.4 | 2.7 |
| Extinguishing Time (Sec.) | 132 | 141 | 133 | 141 | 141 | 77 | 15.3 |

The data indicate that, at a flame retardant surfactant level of 1.8, dipropylene glycol concentrations of 1.5 parts to 2.0 parts significantly improved combustibility properties of the foams embodying them.

EXAMPLES 3 AND 4

In both of these Examples, the foam-forming reaction mixture contained 100 parts NIAX Polyol 16-46, 4.0 parts Thermolin-101, 16 parts fluorotrichloromethane, 2.95 parts water, 0.2 parts NIAX Amine Catalyst A-10, 0.225 parts stannous octoate, and 39.5 parts TDI. In Example 3, Flame Retardant Surfactant L was present in 1.3 parts and the ambient temperature was 80° F. In Example 4, Flame Retardant Surfactant L was present in 1.8 parts and the ambient temperature was 79° F. In both Examples, the dipropylene glycol content was graduated as indicated in the Tables.

TABLE 3

| Dipropylene Glycol | 0.2 | 0.4 | 0.6 | 0.8 | 1.0 | 1.5 | 2.0 |
|---|---|---|---|---|---|---|---|
| Cream Time (Sec.) | 12 | 12 | 12 | 12 | 12 | 12 | 12 |
| Rise Time (Sec.) | 131 | 132 | 132 | 135 | 135 | 133 | 138 |
| Top Collapse (Inches) | −.25 | −.26 | −.20 | −.25 | −.20 | −.25 | −.20 |
| Height of Rise (Inches) | 10.5 | 10.7 | 10.6 | 10.8 | 10.5 | 10.6 | 10.6 |
| Breathability (SCFM) | 4.50 | 4.50 | 4.25 | 4.25 | 4.00 | 3.25 | 4.00 |
| Density (PCF) | 1.22 | 1.22 | 1.23 | 1.22 | 1.22 | 1.24 | 1.25 |
| Flammability Test MVSS 302 (avg. 3 Samples) | | | | | | | |
| Burning Extent (Inches) | 8.2 | 5.4 | 4.6 | 2.6 | 2.7 | 2.0 | 1.6 |
| Extinguishing Time (Sec.) | 79 | 47 | 38 | 16 | 14 | 7 | 2.7 |

The data indicate that, at a flame retardant surfactant level of 1.3, dipropylene glycol concentrations of 0.4 parts to 2.0 parts significantly improved combustibility properties of the foams embodying them.

TABLE 4

| Dipropylene Glycol | 0.2 | 0.4 | 0.6 | 0.8 | 1.0 | 1.5 | 2.0 |
|---|---|---|---|---|---|---|---|
| Cream Time (Sec.) | 12 | 12 | 12 | 12 | 12 | 12 | 12 |
| Rise Time (Sec.) | 136 | 136 | 137 | 138 | 141 | 140 | 141 |
| Top Collapse (Inches) | −.20 | −.20 | −.25 | −.20 | −.20 | −.20 | −.25 |
| Height of Rise (Inches) | 10.7 | 10.6 | 0.9 | 10.5 | 10.6 | 10.6 | 10.8 |
| Breathability (SCFM) | 4.25 | 4.25 | 4.25 | 4.50 | 4.50 | 4.50 | 4.50 |
| Density (PCF) | 1.22 | 1.25 | 1.25 | 1.24 | 1.24 | 1.24 | 1.25 |
| Flammability Test MVSS 302 (avg. 3 Samples) | | | | | | | |
| Burning Extent (Inches) | 8.3 | 5.7 | 4.4 | 3.0 | 3.0 | 2.2 | 2.4 |
| Extinguishing Time (Sec.) | 68 | 49.6 | 41.3 | 22 | 20 | 10.7 | 13.7 |

The data indicate that, at a flame retardant surfactant level of 1.8, dipropylene glycol concentrations of from 0.4 to 2.0 parts significantly improved combustibility properties of the foams embodying them.

EXAMPLES 5 AND 6

In both of these Examples, the ambient temperature was in all cases 78° F. The foam-forming reaction mixtures contained 100 parts NIAX Polyol 16-46, 2.0 parts Thermolin-101, 16 parts fluorotrichloromethane, 2.95 parts water, 0.2 parts NIAX Amine Catalyst A-10, and 0.225 parts stannous octoate. In Example 5, Flame Retardant Surfactant L was present in 1.3 parts. In Example 6, Flame Retardant Surfactant L was present in 1.8 parts.

Since dipropylene glycol contains active hydroxyl groups, it will react with TDI during the foaming process. Likewise since it is a small molecule (i.e., low molecular weight) not much of it is needed in order to affect the actual TDI index, making it lower than it would be without recognizing the presence of dipropylene glycol. To investigate this index effect, a series of foams were made similar to those in Examples 1 and 2. However, this time the TDI index was corrected to account for the dipropylene glycol in the formulation. The major effect of correcting the index for dipropylene glycol on the physical properties of the foam was a decrease in foam breathability.

TABLE 5

| Dipropylene Glycol | 0.2 | 0.4 | 0.6 | 0.8 | 1.0 | 1.5 | 2.0 |
|---|---|---|---|---|---|---|---|
| TDI Index 110 | 39.8 | 40.1 | 40.4 | 40.7 | 41.0 | 41.7 | 42.4 |
| Cream Time (Sec.) | 12–13 | 12–13 | 12–13 | 12–13 | 12–13 | 12–13 | 12–13 |
| Rise Time (Sec.) | 137 | 131 | 133 | 130 | 131 | 131 | 134 |
| Top Collapse (Inches) | 0.3 | 0.35 | 0.3 | 0.25 | 0.25 | 0.2 | 0.15 |
| Height of Rise (Inches) | 10.1 | 10.7 | 10.7 | 10.8 | 10.9 | 11.2 | 11.3 |
| Breathability (SCFM) | 3.8 | 4.0 | 3.9 | 2.8 | 2.2 | 0.8 | 0.18 |
| Density (PCF) | 1.24 | 1.21 | 1.21 | 1.22 | 1.23 | 1.24 | 1.23 |
| Flammability Test MVSS 302 (avg. 3 Samples) | | | | | | | |
| Burning Extent (Inches) | 13 | 11.9 | 10.6 | 9.4 | 6.7 | 6.8 | 4.5 |
| Extinguishing Time (Sec.) | 122 | 100 | 99.7 | 90 | 66 | 69 | 38 |

The data indicate that, at a flame retardant surfactant level of 1.3, dipropylene glycol concentrations of from 0.4 to 2.0 parts significantly improved combustibility properties of the foams embodying them.

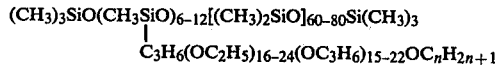

TABLE 6

| Dipropylene Glycol | 0.2 | 0.4 | 0.6 | 0.8 | 1.0 | 1.5 | 2.0 |
|---|---|---|---|---|---|---|---|
| TDI Index 110 | 39.8 | 40.1 | 40.4 | 40.7 | 41.0 | 41.7 | 42.4 |
| Cream Time (Sec.) | 12–13 | 12–13 | 12–13 | 12–13 | 12–13 | 12–13 | 12–13 |
| Rise Time (Sec.) | 133 | 129 | 133 | 129 | 130 | 136 | 136 |
| Top Collapse (Inches) | 0.25 | 0.3 | 0.25 | 0.2 | 0.15 | 0.1 | 0.1 |
| Height of Rise (Inches) | 10.8 | 10.8 | 10.8 | 10.7 | 10.8 | 11.2 | 11.4 |
| Breathability (SCFM) | 4.2 | 3.7 | 3.4 | 1.35 | 2.0 | 0.3 | 0.21 |
| Density (PCF) | 1.22 | 1.23 | 1.23 | 1.23 | 1.25 | 1.24 | 1.23 |
| Flammability Test MVSS 302 (avg. 3 Samples) | | | | | | | |
| Burning Extent (Inches) | 13 | 13 | 13 | 13 | 13 | 13 | 9.3 |
| Extinguishing Time (Sec.) | 126 | 127 | 119 | 122 | 119 | 123 | 88 |

The data indicate that at a flame retardant surfactant level of 1.8, a dipropylene glycol concentration of 2.0 parts significantly improved combustibility properties of the foam embodying it.

What is claimed is:

1. A process for the production of flame retardant flexible polyurethane foams from a reaction mixture comprising aromatic polyisocyanates, polyether polyols, and flame retardant additives, the improvement which comprises utilizing together, in the reaction mixture, from 1 to 2 weight percent of a surfactant of the formula:

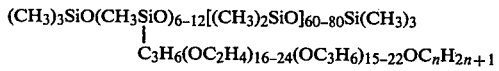

wherein n is an integer of from 1 to 8, and at least from 0.4 to 2.0 weight percent of at least one low molecular weight polyol of one of the formulae:

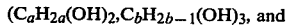

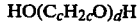

wherein a is an integer of from 2 to 12, b is an integer of from 3 to 11, c is an integer of from 2 to 4, and d is an integer of from 2 to 4.

2. A process as in claim 1 wherein said surfactant has the formula:

and where said low molecular weight polyol is dipropylene glycol.

3. The improved flame retardant flexible polyurethane foam produced by the process of claim 1 or 2.

4. A composition comprising from 1 to 2 parts by weight of a surfactant of the formula:

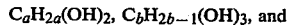

wherein n is an integer of from 1 to 8, and from 0.4 to 2.0 parts by weight of at least one low molecular weight polyol of the formulae

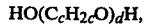

$HO(C_cH_{2c}O)_dH$, wherein a is an integer of from 2 to 12, b is an integer of from 3 to 11, c is an integer of from 2 to 4, and d is an integer of from 2 to 4.

5. A composition as in claim 4 wherein said surfactant has the formula:

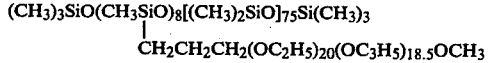

and wherein said low molecular weight polyol is dipropylene glycol.

* * * * *